(12) United States Patent
Ahmann

(10) Patent No.: US 8,050,887 B2
(45) Date of Patent: Nov. 1, 2011

(54) METHOD AND SYSTEM FOR DETERMINING A POTENTIAL FOR ICING ON A WIND TURBINE BLADE

(75) Inventor: Udo Ahmann, Emsdetten (DE)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 12/341,302

(22) Filed: Dec. 22, 2008

(65) Prior Publication Data

US 2010/0143127 A1    Jun. 10, 2010

(51) Int. Cl.
G01P 5/00 (2006.01)
(52) U.S. Cl. .................................................. 702/142
(58) Field of Classification Search ............ 702/2–3, 702/33–35, 39, 41–42, 56, 142, 145–147; 73/1.16, 1.27–1.29, 1.82, 1.84, 66, 460, 462
See application file for complete search history.

(56) References Cited

U.S. PATENT DOCUMENTS

| | | | |
|---|---|---|---|
| 6,890,152 B1 | 5/2005 | Thisted | |
| 7,086,834 B2 * | 8/2006 | LeMieux | 416/1 |
| 7,317,260 B2 * | 1/2008 | Wilson | 290/44 |
| 7,552,614 B2 * | 6/2009 | Wobben | 73/1.29 |
| 7,708,524 B2 * | 5/2010 | Sundermann et al. | 416/39 |
| 2002/0079706 A1 * | 6/2002 | Rebsdorf et al. | 290/55 |
| 2005/0027406 A1 * | 2/2005 | Nonami et al. | 701/3 |
| 2007/0057517 A1 * | 3/2007 | McNerney | 290/44 |
| 2008/0136188 A1 * | 6/2008 | Krueger | 290/44 |
| 2008/0141768 A1 * | 6/2008 | Ormel et al. | 73/170.07 |
| 2008/0307853 A1 * | 12/2008 | Siebers et al. | 73/1.29 |
| 2009/0039650 A1 * | 2/2009 | Nies | 290/44 |
| 2010/0001526 A1 * | 1/2010 | Fukuda et al. | 290/44 |
| 2011/0089692 A1 * | 4/2011 | Girardin | 290/44 |

FOREIGN PATENT DOCUMENTS

| | | | |
|---|---|---|---|
| EP | 1748185 A1 | | 1/2007 |
| WO | WO 97/06367 | * | 2/1997 |
| WO | 0125631 A1 | | 4/2001 |
| WO | WO 2008/093540 | * | 8/2008 |

OTHER PUBLICATIONS

Tim Hughes, "Determining Wind Power Density and Wind Power Classes From Wind Speed Information", The University of Oklahoma, Nov. 11, 2000.*

* cited by examiner

*Primary Examiner* — Michael Nghiem
(74) *Attorney, Agent, or Firm* — Dale J. Davis; Ernest G. Cusick; Frank A. Landgraff

(57) ABSTRACT

An embodiment of the present invention may provide a method and system for detecting icing on at least one wind turbine blade. An embodiment of the present invention takes the form of a software application and process that utilizes the measured wind speed to detect icing on at least one wind turbine blade.

14 Claims, 4 Drawing Sheets

METHOD AND SYSTEM FOR DETERMINING A POTENTIAL FOR ICING ON A WIND TURBINE BLADE

BACKGROUND OF THE INVENTION

The present invention relates to ice accumulation occurring on the rotor blades of a wind turbine; and more particularly a method and system for detecting icing.

Wind turbines are commonly installed in areas where the climatic conditions allow for ice accumulation (hereinafter icing). Icing on the blades of a wind turbine typically leads to several problems including: a reduction in the rotor speed, a reduction in power output, and higher stresses on several components.

Current systems of detecting icing typically require additional hardware such as sensors, piezoelectric transducers, or the like. Moreover, wind turbine operators must generally purchase and install this additional hardware. Wind turbine operators may desire an icing detecting system that utilizes data from existing hardware such as, but not limiting of, anemometers.

There are a few problems with the current systems and methods for addressing icing. The requirement of additional hardware increases the installation and operational costs of the wind turbine. Furthermore, for geographical areas having an average yearly temperature above freezing, the additional costs associated with detecting icing may prohibit wind turbine operation.

For the foregoing reasons, there is a need for an improved method and system for detecting icing utilizing existing wind turbine hardware. The method should not require additional hardware. Furthermore, the method should incorporate existing monitored data to detect icing.

BRIEF DESCRIPTION OF THE INVENTION

In accordance with an embodiment of the present invention, a method of determining a likelihood for icing to occur on at least one wind turbine blade, the method comprising: providing a control system for monitoring an operation of a wind turbine, wherein the wind turbine comprises at least one blade; measuring a wind speed adjacent the wind turbine; receiving a plurality of operating data; wherein the plurality of operating data comprises data related to the operation of the wind turbine; utilizing the plurality of operating data to determine a wind speed estimate; and comparing a measured wind speed with the wind speed estimate; wherein the comparing determines the likelihood of icing to occur on the at least one blade.

In accordance with another embodiment of the present invention, a system for a system for determining the likelihood for icing to occur on at least one wind turbine blade, the system comprising: at least one wind turbine blade; a control system configured for monitoring the at least one wind turbine blade for the potential of icing; a device for measuring a wind speed, wherein the device sends measured wind speed data to the control system; and a wind speed estimator for determining a wind speed estimate, wherein the wind speed estimator sends the wind speed estimate to the control system; wherein the control system uses the measured wind speed data and the wind speed estimate to determine the likelihood for icing to occur on the at least one wind turbine blade.

In accordance with another embodiment of the present invention, a wind turbine system comprising: a tower; a nacelle located at the top of the tower; wherein the nacelle comprises at least one device for measuring a wind speed and a wind speed estimator; a rotor comprising a plurality of wind turbine blades; wherein the rotor is connected to the nacelle; and a control system for monitoring the plurality of wind turbine blades for an icing potential; wherein, the control system receives data on a measured wind speed from the and data on an estimated wind speed from the wind speed estimator.

DETAILED DESCRIPTION OF THE INVENTION

The present invention has the technical effect of determining a potential for icing to occur on at least one wind turbine blade. An embodiment of the present invention takes the form of a software application and process that utilizes wind speed to detect icing on at least one wind turbine blade. The present invention can be applied to many forms of wind turbines (hereinafter turbine) including those located in regions, which may not typically have atmospheric conditions that support icing.

Figure 1:
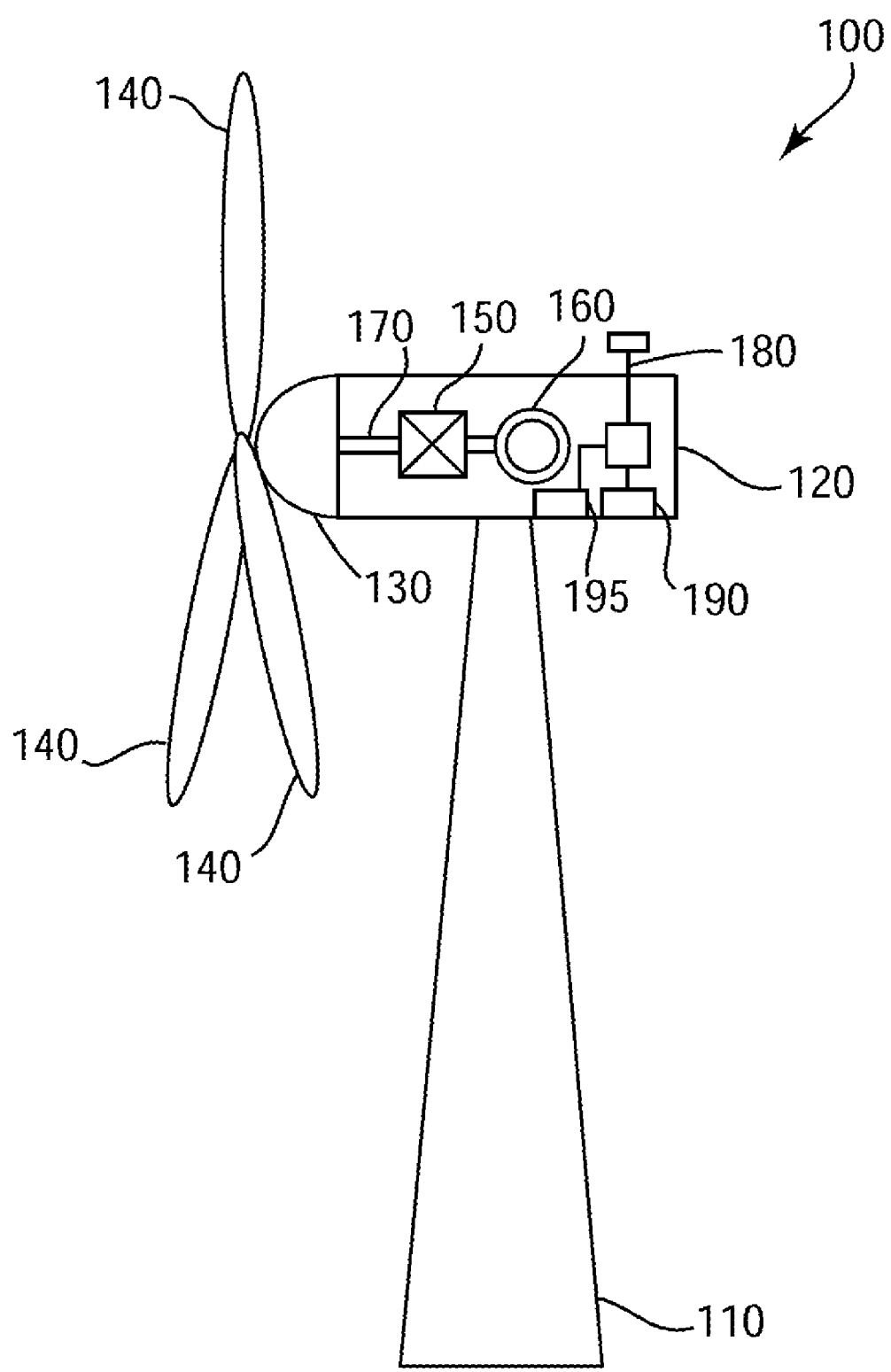
FIG. 1 is a schematic illustrating the environment in which an embodiment of the present invention operates.

FIG. 1 is a schematic illustrating the environment in which an embodiment of the present invention operates. Therein, a turbine 100 includes a tower 110 on which a nacelle 120 is mounted. At a lateral end of the nacelle 120, a hub 130 is mounted which supports a plurality of blades 140. As illustrated, disposed within the nacelle 120 are a gear box 150 and a generator 160. The gear box 150 and the generator 160 are connected to the hub 130 via a drive train 170. Furthermore, at least one instrument 180 may be integrated with the nacelle 120. The at least one instrument 180 may be in the form of a device that measures the wind speed in real time. For example, but not limiting of, the instrument 180 may comprise an anemometer, or the like. As, illustrated in FIG. 1, a portion of the instrument 180 may be located outside of the nacelle 120. Also disposed in the nacelle 120 may be a control system 190 and a wind speed estimator 195.

The wind speed estimator 195 may be considered software that utilizes a plurality of operating data to calculate, in real-time, an estimate of the wind speed. An embodiment of the wind speed estimator 195 receives the plurality of operating data in the form of: a pitch angle of the at least one wind turbine blade, a generator rpm, and a density of the ambient air. The wind speed estimator 195 may be in communication various sensors and devices of the wind turbine which may provide the aforementioned data. The wind speed estimator 195 may comprise firmware that comprises the software, which may be executed by a processor. The wind speed estimator 195 may communicate the estimate of the wind speed to the control system 190.

Communicating with the control system 190 is the instrument 180 and the wind speed estimator 195. The control system 190 may also receive ambient temperature data, which may be used to determine whether the ambient conditions may allow for icing. For example, but not limiting of, the control system 190 may receive data that the ambient temperature is 75 degrees Fahrenheit. Here, the ambient may not allow for icing and hence, the concern for icing on at least one wind turbine blade may be minimized.

One advantage of an embodiment of the present invention is that the instrument 180, and control system 190 are typically normal components of a turbine 100. Therefore, a user is not required to purchase, install, and maintain new instruments 180. A control system 190 of an embodiment of the present invention may be integrated with a broader control system, such as, but not limiting of, a wind turbine control system; a plant control system; a remote monitoring system; or combinations thereof.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

The present invention may be configured to automatically or continuously monitor the turbine during operation, to determine whether or not icing may occur. Alternatively, the present invention may be configured to require a user action to initiate operation.

Figure 2:
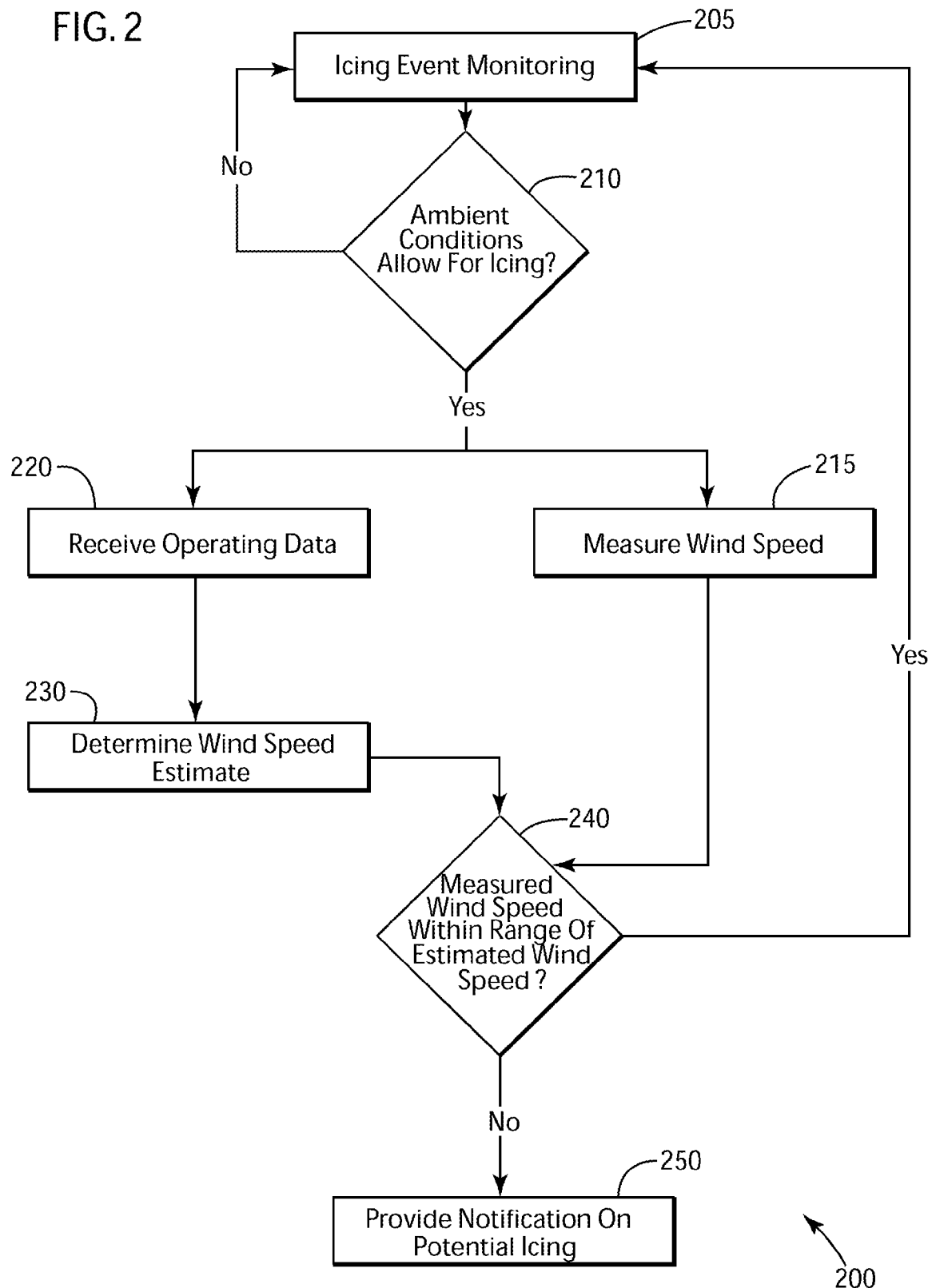
FIG. 2 is a flowchart illustrating an example of a method of detecting icing in accordance with an embodiment of the present invention.

FIG. 2 is a flowchart illustrating an example of a method 200 of detecting icing in accordance with an embodiment of the present invention. In step 205, the method 200 may be enabled to monitoring the activity of a turbine. An embodiment of the method 200 may be configured to continuously operate to determine whether or not icing may be occurring on at least one blade.

In step 210, the method 200 may determine whether the ambient conditions may allow for icing to occur. Here, the method 200 may receive data on the ambient conditions adjacent the turbine. Turbines typically have hardware that provides ambient weather condition data and thus the present invention does not require additional hardware. If step 210 determines that the ambient weather conditions support icing, then the method 200 may proceed; otherwise the method 200 reverts to step 205. An embodiment of the present invention may concurrently: 1) measure the wind speed in real time, in step 215; and 2) determine a wind speed estimate, in steps 220 and 230.

In step 215, the method 200 measures the wind speed. Here, an embodiment of the present invention may receive data from at least one instrument 180 on the wind speed. For example, but not limiting of, the instrument 180 may take the form of an anemometer that measures the wind speed.

In step 220, the method 200 may receive a plurality of operating data. An embodiment of the present invention may receive the plurality of operating data from sensors, devices, or systems currently used by the turbine 100. The plurality of operating data may comprise at least one of: a pitch angle, a generator rpm, and a density of the ambient air, or any other data that may be used by the wind speed.

In step 230, the method 200 may determine an estimate of the wind speed. An embodiment of the present invention may use the aforementioned wind speed estimator 195 to generate an estimate of the wind speed. As discussed, the wind speed estimator 195 utilizes at least one algorithm to calculate an estimate of wind speed based, in part, on the real time operating data received in step 220.

In step 240, the method 200 may determine whether the measured wind speed of step 215 is within a range of the wide speed estimate determined in step 230. As discussed, icing on at least one wind turbine blade may cause a decrease in generator rpm. If the wind speed estimate is not within a range of the measured wind speed then icing be present on the at least one wind turbine blade. For example, but not limiting of, if the wind speed estimate is not within 10% of the measured wind speed, then icing of at least one wind turbine blade may be occurring. In an embodiment of the present invention, the range may be preconfigured. In an alternate embodiment of the present invention, a user may set and/or change the range. If the wind speed estimate is not within the range of the measured wind speed, then the method 200 may proceed to step 250; otherwise the method 200 may revert to step 205.

In step 250, the method 200 may be configured to provide a notification that a potential for icing of at least one wind turbine blade exist. The notification may be an alarm of varying forms such as, but not limited to, an audio signal, a graphic, or a text message, or the like.

Figure 3:
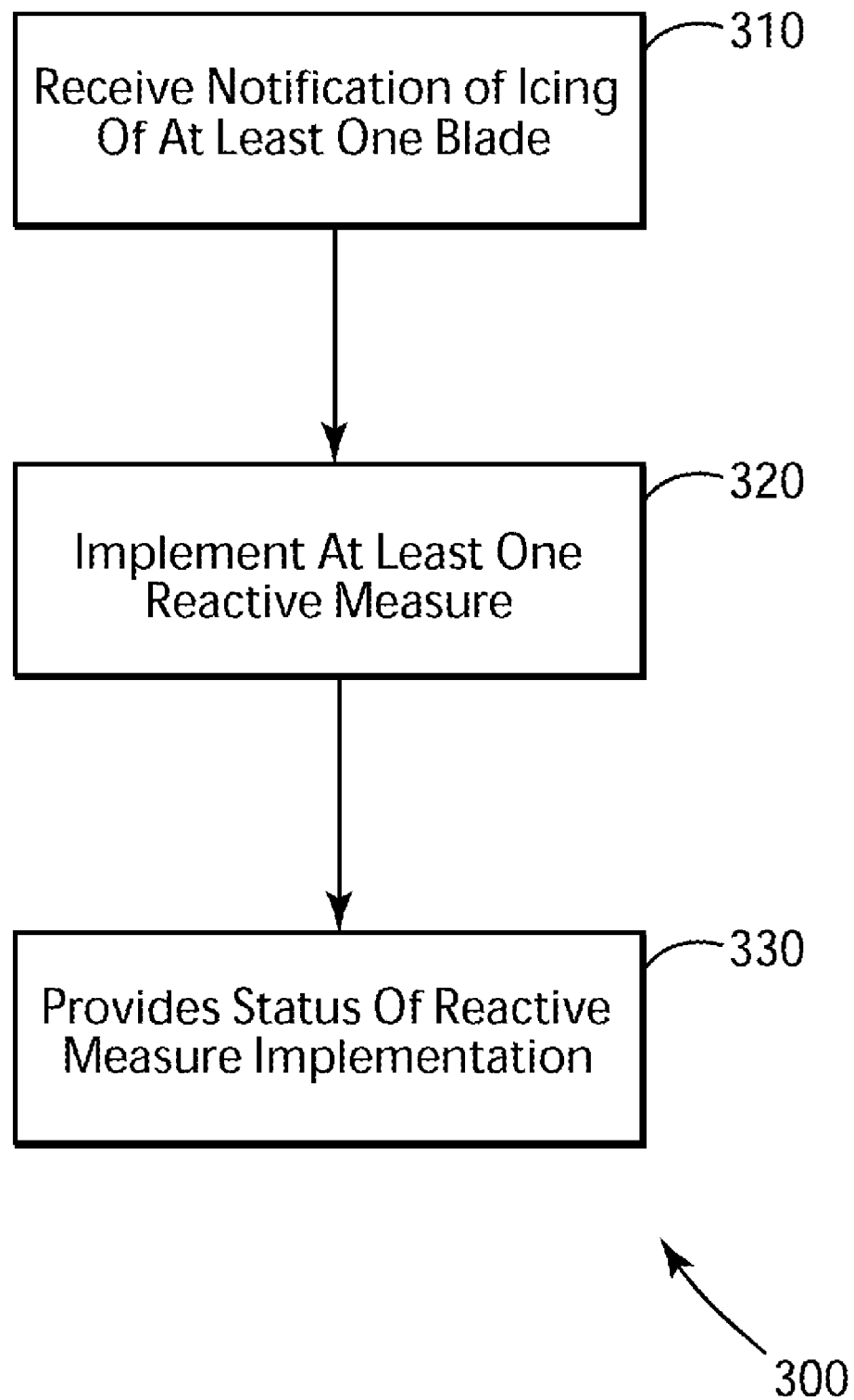
FIG. 3 is a flowchart illustrating an example of a method of responding to a detection of icing in accordance with an embodiment of the present invention.

FIG. 3, which is a flowchart illustrating an example of a method 300 of responding to a detection of icing, in accordance with an embodiment of the present invention.

In block 310, the method 300, receives a notification of icing of at least one blade from the method 200. Here, the method 300 may take the form of a control system. The control system may include for example, but not limited to, a turbine control system, a plant control system, or the like. The notification may be received by the control system, for example, but not limited to, via a wired, wireless, or other forms of electronically transmitting the notification.

In block 320, the method 300, may implement at least one reactive measure to reduce or remove the icing. A reactive measure may include for example, but not limited to, reducing the rotor speed, lowering a power generation set point, braking procedures, or the like.

In block 330, the method 300, provides a status notification on the at least one reactive measure that was implemented. The notification may be an alarm of varying forms such as, but not limited to, an audio signal, a graphic, or a text message, or the like.

Figure 4:
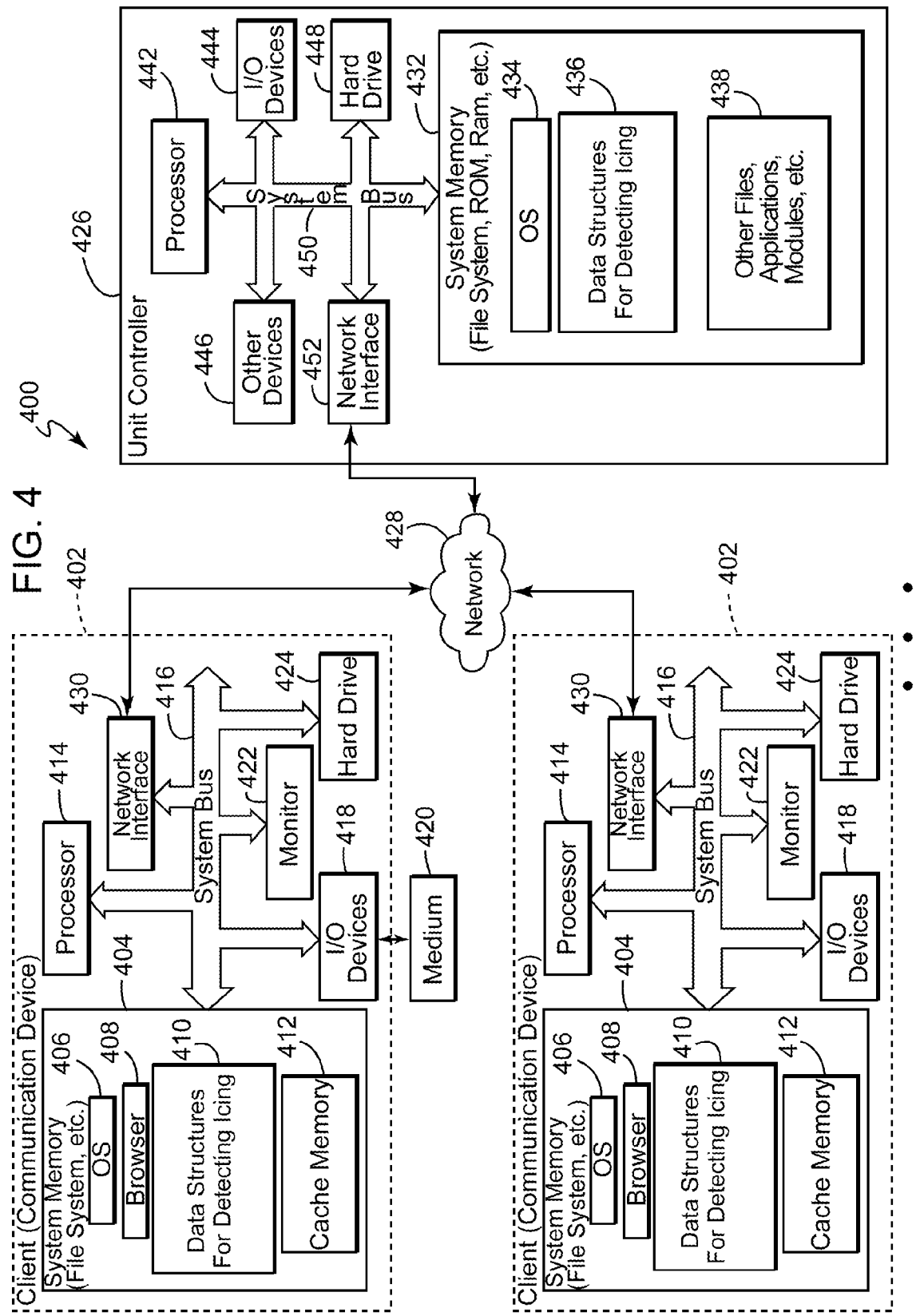
FIG. 4 is a block diagram of an exemplary system for detecting icing in accordance with an embodiment of the present invention.

FIG. 4 is a step diagram of an exemplary system 400 to detect icing in accordance with an embodiment of the present invention. The elements of the methods 200 and 300 may be embodied in and performed by the system 400. The system 400 may include one or more user or client communication devices 402 or similar systems or devices (two are illustrated in FIG. 4). Each communication device 402 may be for example, but not limited to a computer system, a personal digital assistant, a cellular phone, or similar device capable of sending and receiving an electronic message.

The communication device 402 may include a system memory 404 or local file system. The system memory 404 may include for example, but not limited to, a read only memory (ROM) and a random access memory (RAM). The ROM may include a basic input/output system (BIOS). The BIOS may contain basic routines that help to transfer information between elements or components of the communication device 402. The system memory 404 may contain an operating system 406 to control overall operation of the communication device 402. The system memory 404 may also include a browser 408 or web browser. The system memory 404 may also include data structures 410 or computer-executable code to detect icing that may be similar or include elements of the method 200 and 300 in FIGS. 2 and 3, respectively.

The system memory 404 may further include a template cache memory 412, which may be used in conjunction with the method 200 and 300 in FIGS. 2 and 3, respectively; to automatically store data from the most recent icing detection.

The communication device 402 may also include a processor or processing unit 414 to control operations of the other components of the communication device 402. The operating system 406, browser 408, data structures 410 may be operable on the processor 414. The processor 414 may be coupled to the memory system 404 and other components of the communication device 402 by a system bus 416.

The communication device 402 may also include multiple input devices, output devices or combination input/output devices 418. Each input/output device 418 may be coupled to the system bus 416 by an input/output interface (not shown in FIG. 4). The input and output devices or combination I/O devices 418 permit a user to operate and interface with the communication device 402 and to control operation of the browser 408 and data structures 410 to access, operate and control the software to automatically store data from the most recent icing detection. The I/O devices 418 may include a keyboard and computer pointing device or the like to perform the operations discussed herein.

The I/O devices 418 may also include disk drives, optical, mechanical, magnetic, or infrared input/output devices, moderns or the like. The I/O devices 418 may be used to access a medium 420. The medium 420 may contain, store, communicate, or transport computer-readable or computer-executable instructions or other information for use by or in connection with a system, such as the communication devices 402.

The communication device 402 may also include or be connected to other devices, such as a display or monitor 422. The monitor 422 may be used to permit the user to interface with the communication device 402.

The communication device 402 may also include a hard disk drive 424. The hard drive 424 may be coupled to the system bus 416 by a hard drive interface (not shown in FIG. 4). The hard drive 424 may also form part of the local file system or system memory 404. Programs, software, and data may be transferred and exchanged between the system memory 404 and the hard drive 424 for operation of the communication device 402.

The communication devices 402 may communicate with a remote server 426 and may access other servers or other communication devices similar to communication device 402 via a network 428. The system bus 416 may be coupled to the network 428 by a network interface 430. The network interface 430 may be a modem, Ethernet card, router, gateway, or the like for coupling to the network 428. The coupling may be a wired connection or wireless. The network 428 may be the Internet, private network, an intranet, or the like.

The server 426 may also include a system memory 432 that may include a file system, ROM, RAM, and the like. The system memory 432 may include an operating system 434 similar to operating system 406 in communication devices 402. The system memory 432 may also include data structures 436 to automatically store data from the most recent icing detection. The data structures 436 may include operations similar to those described with respect to the method 200 for detecting icing in accordance with an embodiment of the present invention. The server system memory 432 may also include other files 438, applications, modules, and the like.

The server 426 may also include a processor 442 or a processing unit to control operation of other devices in the server 426. The server 426 may also include I/O device 444. The I/O devices 444 may be similar to I/O devices 418 of communication devices 402. The server 426 may further include other devices 446, such as a monitor or the like to provide an interface along with the I/O devices 444 to the server 426. The server 426 may also include a hard disk drive 118. A system bus 450 may connect the different components of the server 426. A network interface 452 may couple the server 426 to the network 428 via the system bus 450.

The flowcharts and step diagrams in the Figures illustrate the architecture, functionality, and operation of possible implementations of systems, methods and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of determining a likelihood for icing on at least one wind turbine blade, the method comprising:
    providing a control system for monitoring an operation of a wind turbine, wherein the wind turbine comprises the at least one blade;
    measuring a wind speed at the wind turbine using at least one instrument integrated with the wind turbine;
    receiving a plurality of wind turbine operating data; wherein the plurality of wind turbine operating data comprises: a pitch angle of the at least one blade, a generator rpm, and a density of ambient air;
    utilizing the plurality of wind turbine operating data to determine a wind speed estimate at a location adjacent the at least one instrument that measures the wind speed;
    comparing a measured wind speed with the wind speed estimate; and
    utilizing a comparison on the measured wind speed with the wind speed estimate to determine whether icing is occurring on the at least one blade.

2. The method of claim 1, further comprising determining whether an ambient condition allows for icing to occur on the at least one blade.

3. The method of claim 1, further comprising providing a notification on the likelihood for icing to occur on the at least one blade.

4. The method of claim 3, further comprising: implementing at least one reactive measure after receiving the notification on the likelihood for icing to occur on the at least one blade; and providing a status on the at least one reactive measure.

5. The method of claim 1, wherein the at least one instrument comprises an anemometer.

6. The method of claim 1, wherein the step of utilizing the plurality of wind turbine operating data to determine determining the wind speed estimate comprises utilizing a processor configured with a wind speed estimator.

7. The method of claim 6, wherein the wind speed estimator utilizes the plurality of operating data to calculate the wind speed estimate.

8. A system for determining a likelihood for icing to occur on at least one wind turbine blade, the system comprising:
    the at least one wind turbine blade;
    a control system configured for monitoring the at least one wind turbine blade for
        the a potential of icing; wherein the control system receives a plurality of wind turbine operating data comprising: a pitch angle of the at least one blade, a generator rpm, and a density of ambient air;
    a device for measuring a wind speed, wherein the device is integrated with the wind turbine and sends measured wind speed data to the control system; and
    a wind turbine wind speed estimator for determining a wind turbine wind speed estimate, wherein the wind turbine wind speed estimator uses the plurality of wind turbine operating data to determine a wind turbine wind speed estimate at a location adjacent the devices that measures the wind speed; and the wind turbine wind speed estimator sends the wind turbine wind speed estimate to the control system;
    wherein the control system compares a measured wind speed with the wind speed estimate; and utilizes a comparison on the measured wind speed with the wind speed estimate to determine whether icing is occurring on the at least one blade.

9. The system of claim 8, wherein the control system determines whether an ambient condition allows for icing to occur on the at least one wind turbine blade.

10. The system of claim 8, wherein the device comprises an anemometer.

11. The system of claim 8, wherein the wind turbine wind speed estimator comprises a processor configured with a wind speed estimating software.

12. The system of claim 11, wherein the wind turbine wind speed estimator receives a plurality of operating data to calculate the wind speed estimate.

13. The system of claim 8, wherein the control system is integrated with at least one of: a wind turbine control system; a plant control system; a remote monitoring system; or combinations thereof.

14. A wind turbine system comprising:
a tower;
a nacelle located at the top of the tower; wherein the nacelle comprises at least one device integrated with the nacelle for measuring a wind speed and a wind speed estimator;
a rotor comprising a plurality of wind turbine blades; wherein the rotor is connected to the nacelle; and
a control system for monitoring the plurality of wind turbine blades for an icing potential; wherein the control system receives a plurality of wind turbine operating data comprising: a pitch angle of the at least one blade, a generator rpm, and a density of ambient air;
wherein, the control system receives data on a measured wind speed from the at least one device for measuring wind speed and data on an estimated wind speed from the
wind speed estimator; wherein the wind turbine wind speed estimator uses the plurality of wind turbine operating data to determine a wind turbine wind speed estimate at a location adjacent the at least one device that measures the wind speed;
wherein the control system compares a measured wind speed with the wind speed estimate; and utilizes a comparison on the measured wind speed with the wind speed estimate to determine whether icing is occurring on the at least one blade.

* * * * *